Figure 1:
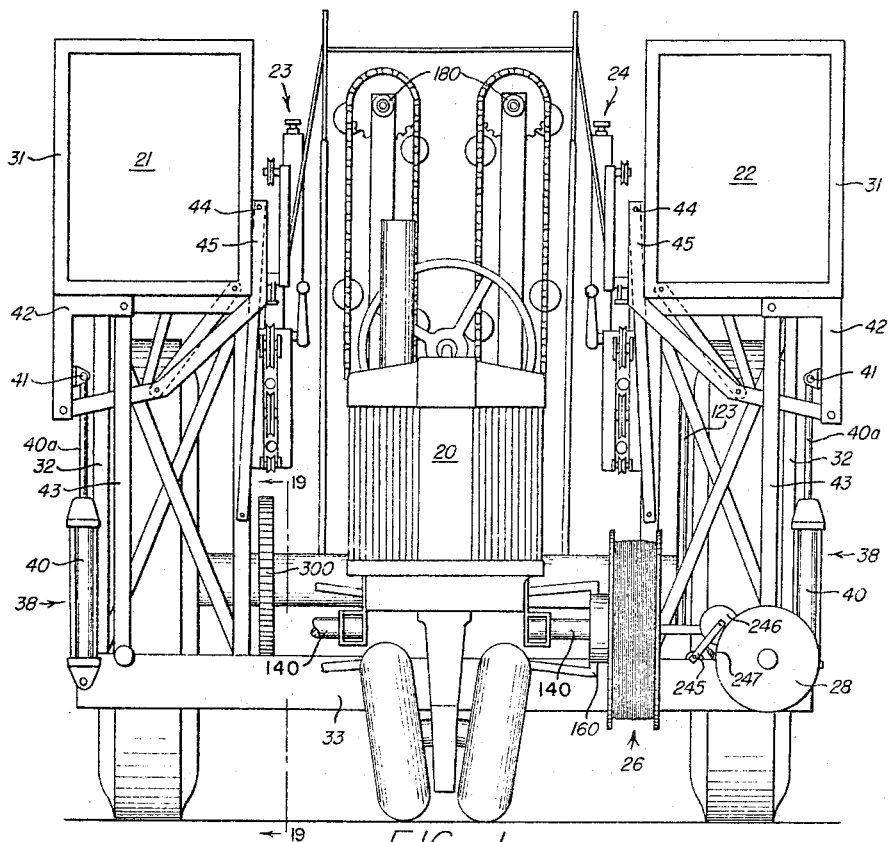

Aug. 23, 1966

H. H. RASMUSSEN 3,267,609

POLE BEAN STAKING AND TRELLISING MACHINE

Filed June 1, 1964

7 Sheets-Sheet 1

INVENTOR.
HARVEY H. RASMUSSEN

BY *Mallinckrodt*
*Mallinckrodt*

ATTORNEYS

Aug. 23, 1966  H. H. RASMUSSEN  3,267,609
POLE BEAN STAKING AND TRELLISING MACHINE
Filed June 1, 1964  7 Sheets-Sheet 3

INVENTOR.
HARVEY H. RASMUSSEN
BY Mallinckrodt and Mallinckrodt
ATTORNEYS

Aug. 23, 1966    H. H. RASMUSSEN    3,267,609
POLE BEAN STAKING AND TRELLISING MACHINE
Filed June 1, 1964    7 Sheets-Sheet 4

INVENTOR.
HARVEY H. RASMUSSEN

BY *Mallinckrodt*
*Mallinckrodt and*
ATTORNEYS

Aug. 23, 1966   H. H. RASMUSSEN   3,267,609
POLE BEAN STAKING AND TRELLISING MACHINE
Filed June 1, 1964   7 Sheets-Sheet 5
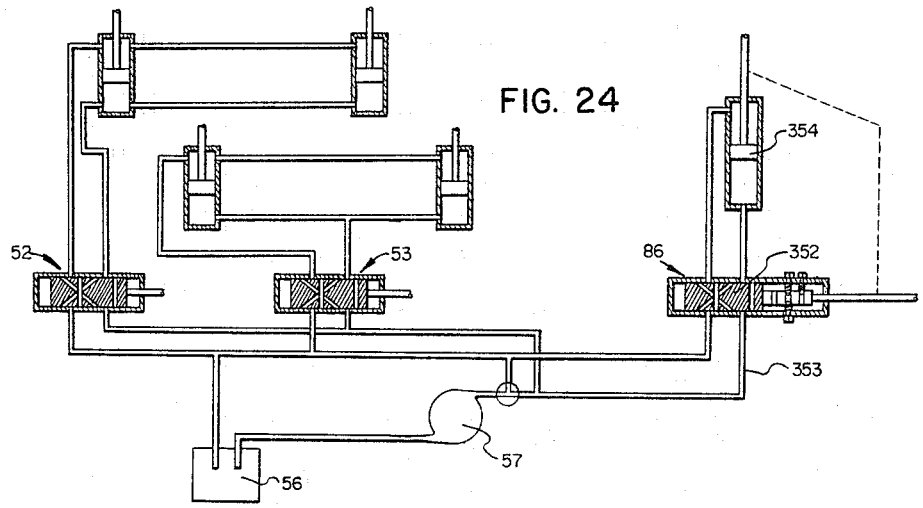
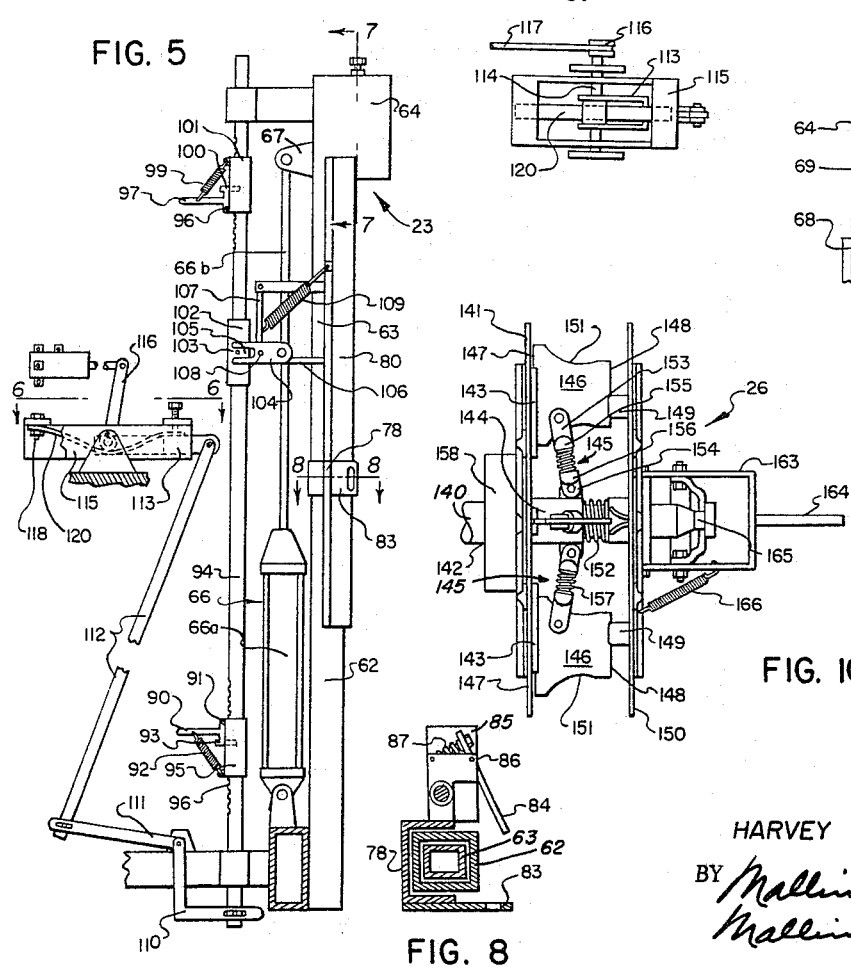
INVENTOR.
HARVEY H. RASMUSSEN
BY
ATTORNEYS Aug. 23, 1966  H. H. RASMUSSEN  3,267,609
POLE BEAN STAKING AND TRELLISING MACHINE
Filed June 1, 1964   7 Sheets-Sheet 6
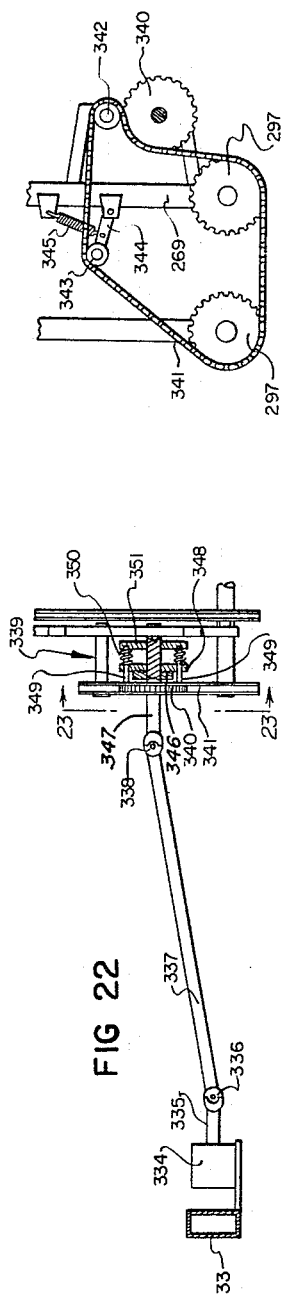
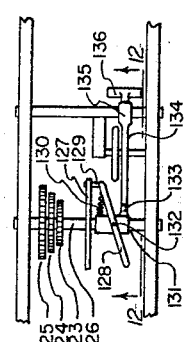
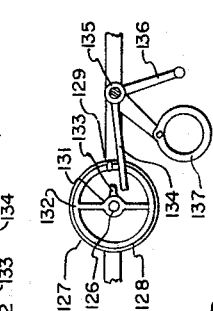
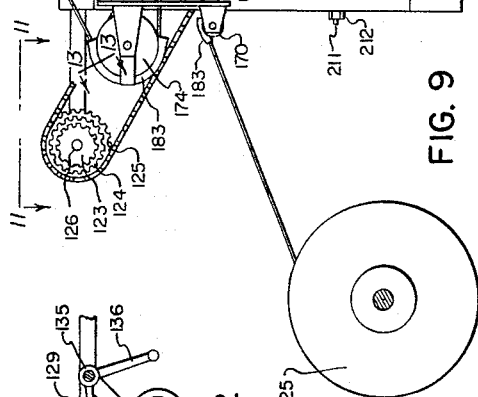
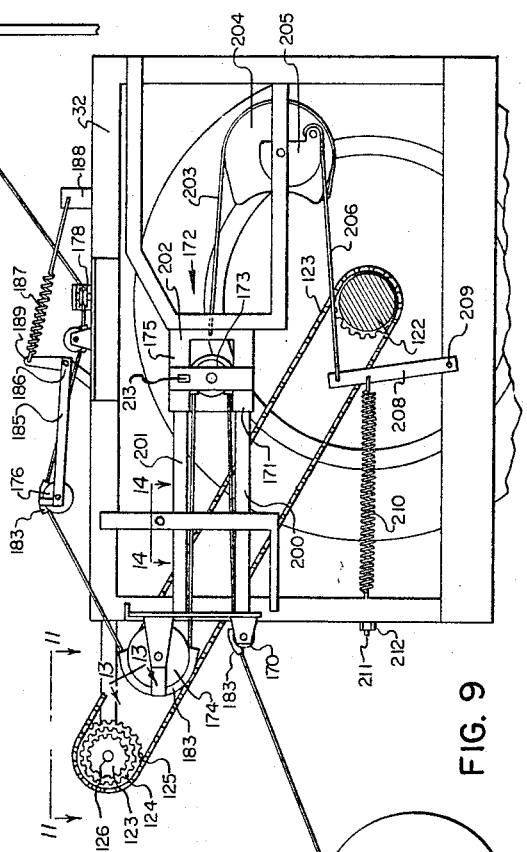
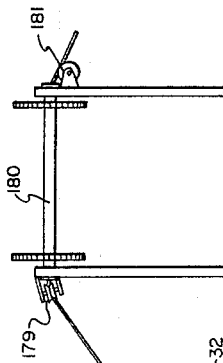
INVENTOR.
HARVEY H. RASMUSSEN
BY *Mallinckrodt and Mallinckrodt*
ATTORNEYS Aug. 23, 1966  H. H. RASMUSSEN  3,267,609
POLE BEAN STAKING AND TRELLISING MACHINE
Filed June 1, 1964  7 Sheets-Sheet 7

INVENTOR.
HARVEY H. RASMUSSEN
BY Mallinckrodt and Mallinckrodt
ATTORNEYS

United States Patent Office

3,267,609
Patented August 23, 1966

3,267,609
POLE BEAN STAKING AND TRELLISING MACHINE
Harvey H. Rasmussen, 273 W. 1st S., Preston, Idaho
Filed June 1, 1964, Ser. No. 371,731
19 Claims. (Cl. 47—1)

Pole beans and other climbing vine crops such as grapes, hops, etc. require a strong trellis to support the vines as they grow. If the vines become intertwined, they tend to be mutually supporting and they are much less apt to be blown down by the wind or to fall under their own weight.

The trellises customarily employed for such crops are formed by interconnecting spaced vertical posts with a top wire and a bottom cord and crisscrossing string around the horizontally extending wire and cord. Conventionally, the trellises are built by hand, or one machine is employed to place the vertical posts and a separate machine is used to position the top wire and bottom cord and crisscross string around the wire and cord. To properly simultaneously construct two rows of trellises in the past has generally required at least two tractors, for driving the posts and two more to position the horizontal wire and cord and to crisscross the string. A minimum of ten men are employed in such operation, with four tractor operators, two men positioning posts in the presses used to place them into the ground and two more following each trellising tractor to attach the horizontal wire and cord to the vertical posts.

Additional men are required to obtain the posts and space them appropriately in rows across the field, and to keep the machines supplied with wire, cord and string.

Principal objects of the present invention are to provide a single machine capable of carrying the stakes, wire, cord, and string required to trellis the usual half-acre bean field; that will plant the posts at evenly spaced distances, position the horizontal wire and cord, and crisscross the string around the wire and cord for two rows of trellises simultaneously; that will plant the vertical posts without breaking them; and that will maintain constant tension on the wire, cord, and string during the entire operation to prevent their breaking or unravelling.

Using the machine of the present invention, one tractor and five men can do the same amount of trellising heretofore done by four tractors and ten men in the same or less time; and the resultant trellis is stronger and has a greater interlacing of crisscross string to guide the climbing vines into a mutually supporting condition, even though the amount of string used is the same as has been required in previous trellising operations.

In accomplishing the above objects I employ a single tractor carrying and operating a pair of stake carriers movable between a low loading position and a raised carrying position; a pair of stake presses having means to support the stakes and keep them from buckling as they are forced into the ground at spaced intervals indicated by a distance warning device; a pair of wire feed systems that will feed wire under constant tension and that will effectively warn the operator in the event of failure of the wire to properly feed; a pair of cord feed systems that will supply cord under constant tension; and a pair of trellising units that will each crisscross eight separate strands of string around the upper wire and lower cord as they are fed from their corresponding wire and cord feed system.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 2:
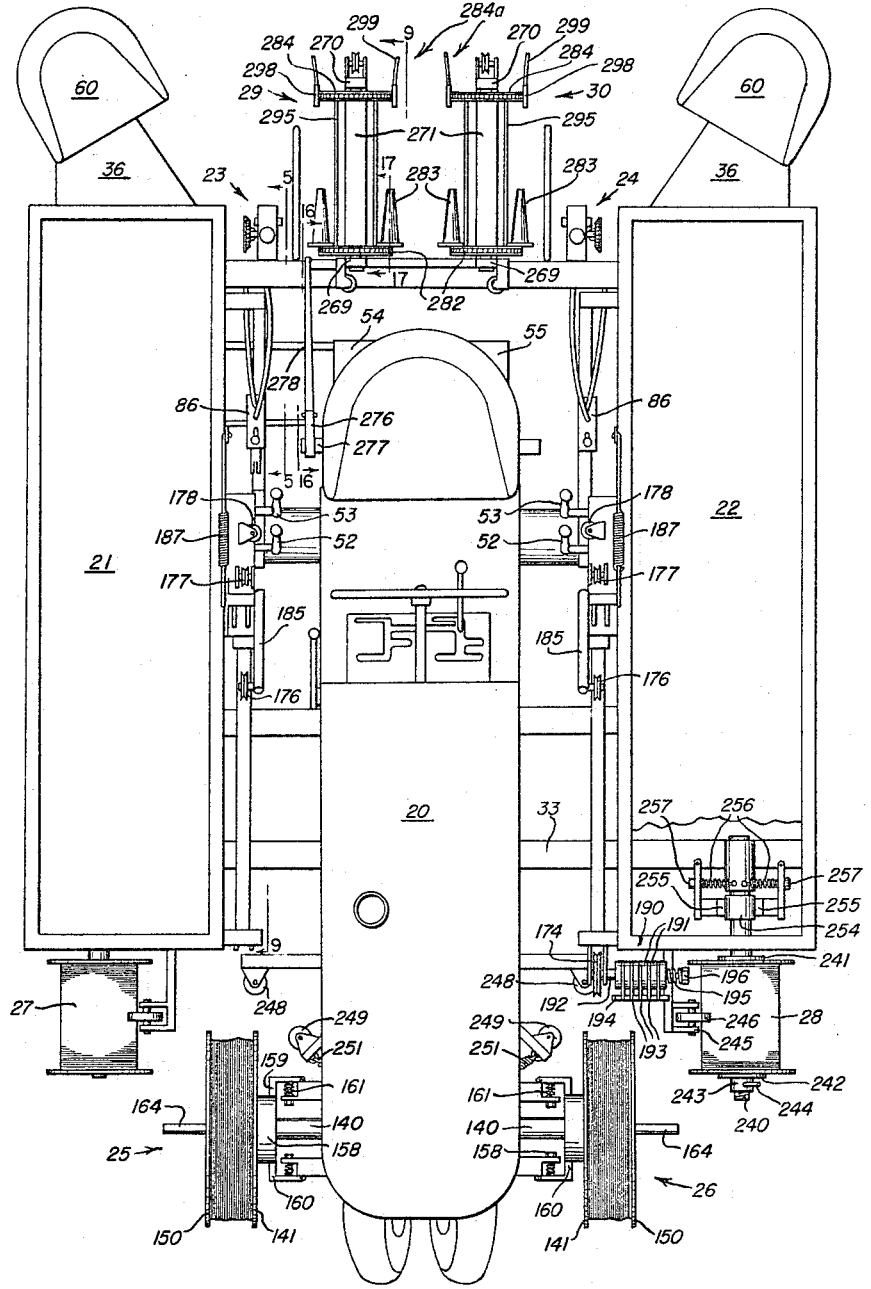
Figure 3:
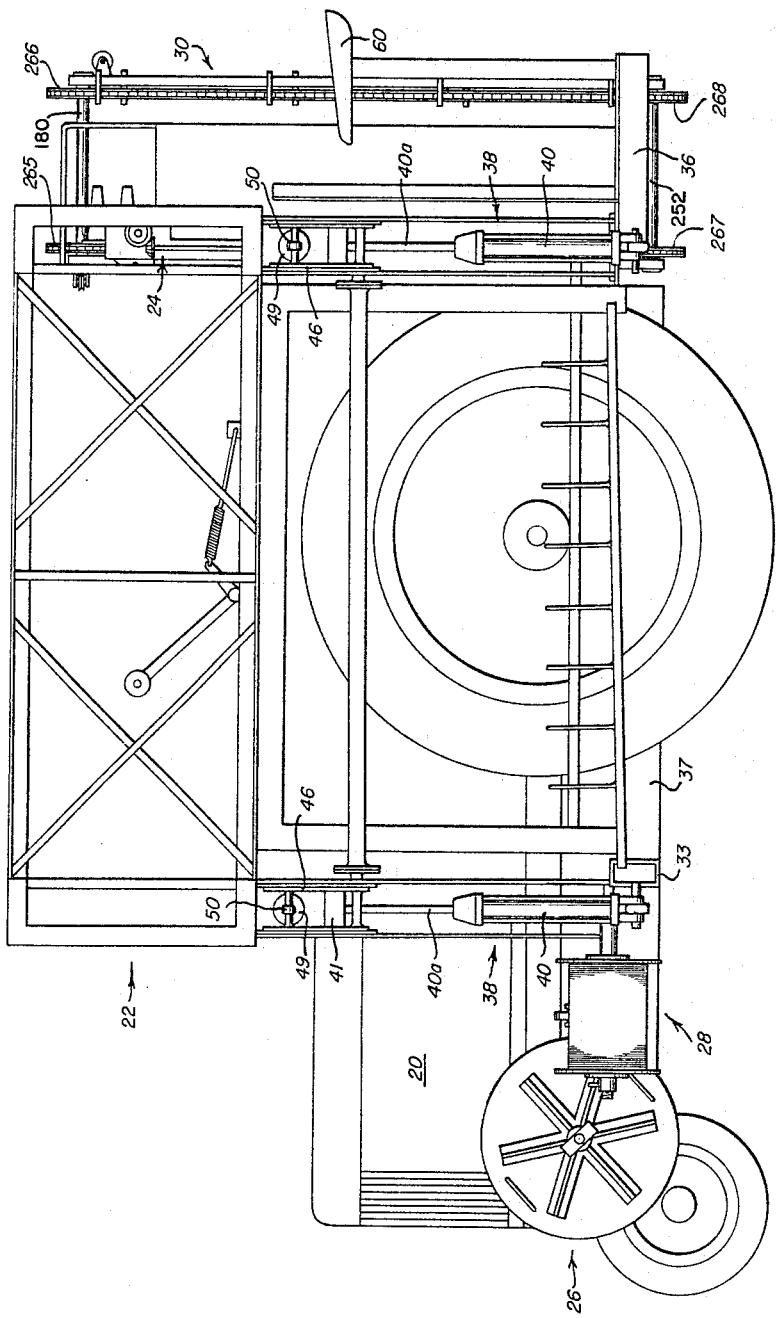
Figure 4:
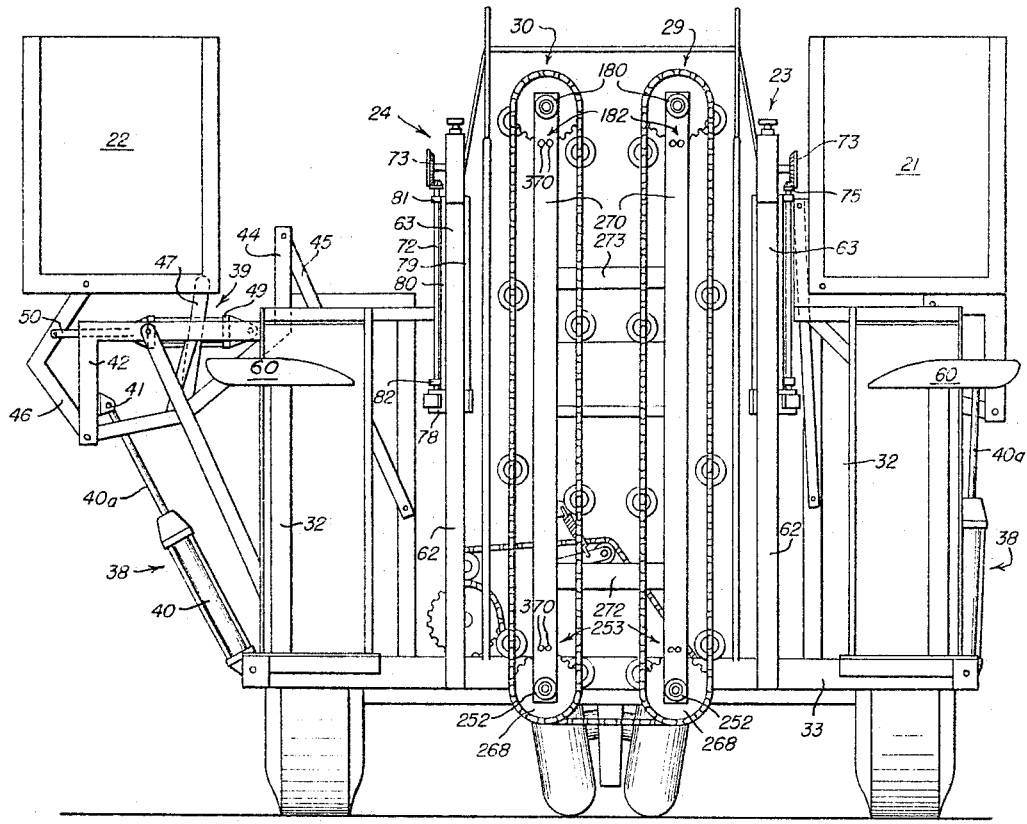

In the drawings:

FIG. 1 is a front elevation of the invention with one of the wire reels and one of the cord spools removed for clarity;

FIG. 2, a top plan view;

FIG. 3, a side elevation;

FIG. 4, a rear elevation showing one stake rack partially extended;

FIG. 5, a vertical section taken on line 5—5 of FIG. 2 and showing a stake press and the control linkage and control valve therefor;

FIG. 6, a fragmentary top plan view of the stake press control valve linkage of FIG. 5, taken from line 6—6 of FIG. 5;

FIG. 7, a vertical section taken on line 7—7 of FIG. 5;

FIG. 8, a horizontal section taken on line 8—8 of FIG. 5;

FIG. 9, a vertical section taken on line 9—9 of FIG. 2 and showing the path of wire travel.

Figure 19:
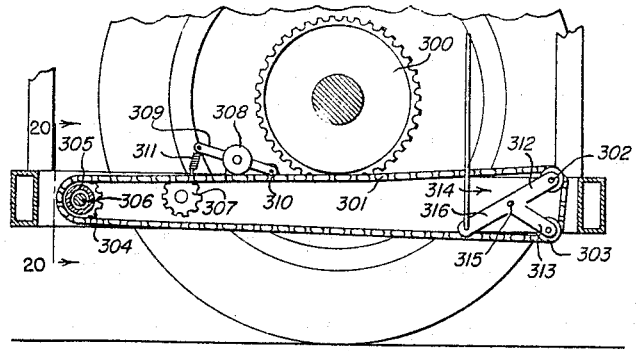
Figure 20:
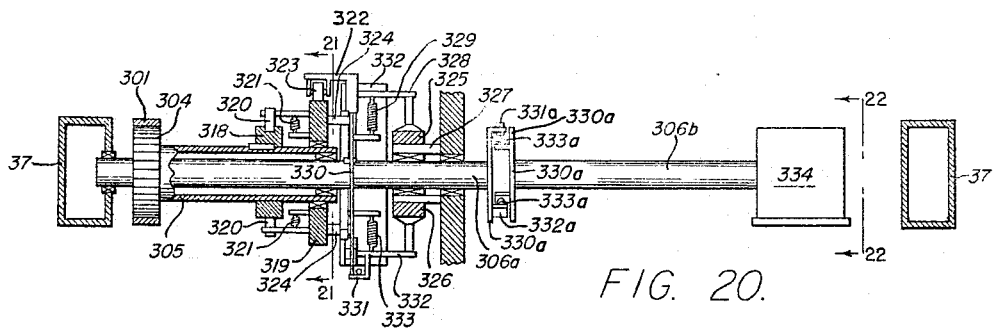
Figure 21:
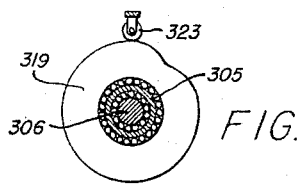
Figure 14:
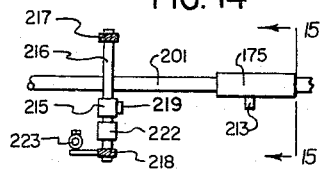
Figure 15:
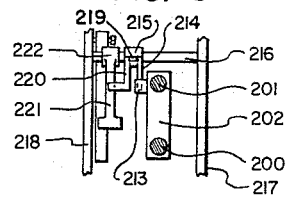
Figure 16:
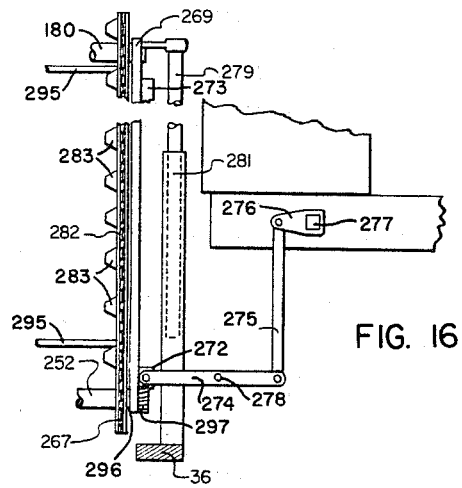
Figure 17:
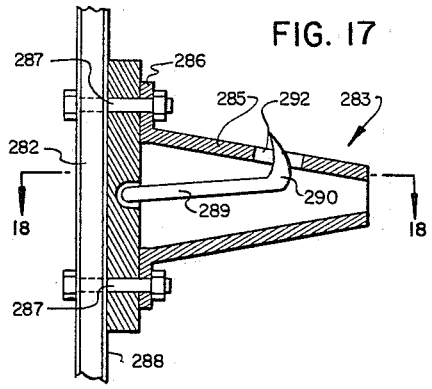
Figure 18:
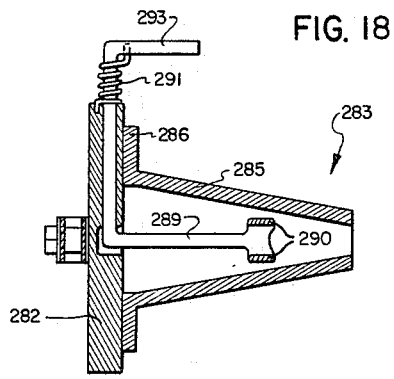
Figure 25:
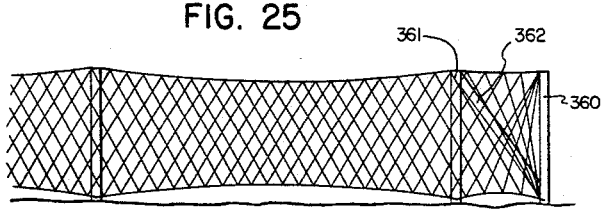

FIG. 10, a fragmentary top plan showing the wire reel;

FIG. 11, a fragmentary top plan view of the distance warning device as viewed from line 11—11 of FIG. 9;

FIG. 12, a vertical section taken on line 12—12 of FIG. 11;

FIG. 13, a vertical section taken on line 13—13 of FIG. 9;

FIG. 14, a fragmentary horizontal section taken on line 14—14 of FIG. 9, showing the wire tension warning device;

FIG. 15, a fragmentary vertical section taken on line 15—15 of FIG. 14;

FIG. 16, a vertical section taken on line 16—16 of FIG. 2 and showing the lift mechanism for the trellisers;

FIG. 17, a greatly enlarged vertical section through a string spool taken on line 17—17 of FIG. 2;

FIG. 18, a horizontal section taken on line 18—18 of FIG. 17;

FIG. 19, a vertical section taken on line 19—19 of FIG. 1, showing a portion of the trelliser drive assembly;

FIG. 20, a vertical section taken on line 20—20 of FIG. 19 and showing another portion of the trelliser drive assembly;

FIG. 21, a vertical section taken on line 21—21 of FIG. 20;

FIG. 22, a view similar to FIG. 19 and taken on line 22—22 of FIG. 20;

FIG. 23, a similar view taken on line 23—23 of FIG. 22;

FIG. 24, a schematic representation of the hydraulic control circuit for the stake carrier and stake press at one side of the tractor; and FIG. 25, a vertical elevation showing a section of trellis constructed using the present invention.

Referring now to the drawings:

In the illustrated preferred embodiment, a single tractor 20 is shown carrying a pair of stake racks 21 and 22; a pair of stake presses 23 and 24; a pair of wire spools 25 and 26; a pair of cord spools 27 and 28; and a pair of trellisers 29 and 30.

*The stake racks*

Stake racks 21 and 22 are identical and each consists of a framework box 31 in which the stakes required for a field are placed. Means, to be described, are provided to power the racks between a lowered loading position and a raised travel position over the rear tractor wheels. A frame 32 surrounds each rear tractor wheel and these are fixed to and supported by cross-beams 33 and 34, which are fixed to the tractor frame and extend there-beneath at a point ahead of the rear wheels, and platforms 36 positioned at the rear of each wheel.

Platforms 36 are mounted at the rear of tractor 20 on longitudinal bars 37, FIG. 3, which are fixed to crossbeams 33 and 34. Besides frames 32, the platforms support the stake presses 23 and 24, and seats for persons placing stakes in the presses, all as will be further described.

Stake racks 21 and 22 are each powered in vertical movement by a pair of hydraulic cylinders 38 and laterally by a pair of smaller hydraulic cylinders 39, only one of which is shown in dotted lines in FIG. 4. Housings 40 of cylinders 38 at the front and rear of each stake rack are pivotally connected to cross-beam 33 and platform 36 respectively, and their piston rods 40a are each pivotally connected to a flange 41 of a truss 42 pivotally mounted on support arm 43. An extension 44 of each truss is pivotally connected to a guide rod 45, which is similarly pivotally connected at its other end to frame 32. Extension of piston rods 40 will rotate pivot support arms 42 about their fixed pivot connections to the cross-beams 33 and platform 36. Guide rods 45 extend parallel to pivot support arms 42 to maintain the stake racks in an upright position throughout their entire range of movement. Angulated arm 46 and straight support 47 are pivotally connected at one end to the truss, and at their other end to the bottom of the stake racks.

Housings 49 of hydraulic cylinders 39 and pivotally connected to the truss and their piston rods 50 are similarly connected to angulated arms 46 such that extension and retraction of their piston rods will pivot angulated arms 46 and straight supports 47 about their pivot connections with truss 42.

In operation cylinders 38 are operated to pivot the truss and the stake racks about the fixed pivot connections of pivot support arm 42 and guide rod 45, from a loading position wherein the stake rack is just above the ground to a carrying position wherein the bottom of the stake rack is raised substantially level with, and adjacent to the top of frames 32. Actuation of cylinders 39 will then pivot the angulated arm 46 and straight support 47 about their pivot connections with truss 42, to carry the stake racks up, over, and onto frames 32. To lower the racks a reverse procedure is followed, with cylinders 39 being actuated first to allow the racks to clear the wheel frames and with cylinders 38 then actuated to lower the racks to the ground.

The control system for each stake rack includes a control valve 52 to regulate supply and exhaust of its cylinders 38 and another control valve 53 to regulate supply and exhaust of cylinders 39.

The usual farm tractor hydraulic reservoir 54 and pump 55 serve the cylinders 38 and 39 of one stake carrier and another reservoir 56 and pump 57 (FIG. 24), driven by the usual tractor power take-off, supplies the fluid necessary to operate the hydraulic cylinders of the other stake rack.

The stake presses

The stake presses 23 and 24 are identical and the description of one, together with its operating structure should suffice for both. They are each supported on one of the platforms 36, at opposite sides of the rear of the tractor, so that men sitting on seats 60 carried by the platforms 36 behind stake racks 21 and 22 can easily remove stakes from the racks and place them in the presses which drive them into the ground in a manner to be described. Each stake press includes a sleeve 62 fixed to one of the platforms 36, a reciprocating member 63 slidable within sleeve 62, and a head 64 carried by reciprocating member 63. A hydraulic cylinder 66 (FIG. 5) has its housing 66a pivotally fixed to platform 36 and its rod 66b pivotally connected to reciprocating member 63 at flange 67 such that actuation of the hydraulic cylinder to reciprocate rod 66b will reciprocate member 63 in sleeve 62. As is best seen in FIG. 7, engagement of head 64 with a stake placed in the press causes piston member 68 within the head to move upwardly against spring 69, carrying with it a rack 70. Movement of rack 70 rotates pinion gear 71 in engagement therewith, shaft 72 fixed to gear 71, and bevel gear 73 fixed to shaft 72. Stop bolt 74 is adjustably positioned through head 64 and limits the upward movement of piston 68 as desired. Rotary motion of bevel gear 73 is transmitted through corresponding meshing bevel gear 75 to a rod 76 fixed to gear 75 and extending downwardly along the press to collar 78.

Collar 78 freely surrounds sleeve 62 and is fixed to head 64 by braces 79 and 80 which also serve as stake guides so that as the head is reciprocated, collar 78 will slide on the sleeve.

Rod 76 is journaled through brackets 81 and 82, which hold the rod in spaced relation to the press and hold bevel gears 73 and 77 in mesh.

A slotted ear 83 is fixed to and extends outwardly from collar 78 to receive a tongue 84 carried by box 85 fixed at the lower end of rod 76. Rotation of rod 76 turns box 85 and swings tongue 84 around brace 80 and into the slot. Tongue 84 is pivotally connected to box 85 at 86 and a compression spring 87 biases the tongue against brace 88 and a stake in the press so that it will be guided into the slot.

In operation, with the hydraulic cylinder rod 66b extended, the head 64 raised, a stake is placed upright against sleeve 62 and member 63 and within braces 79 and 80 and the hydraulic cylinder is actuated to withdraw the cylinder rod. This moves the press head 64 down until member 68 contacts the top of the stake. Continued downward movement will move member 68 upward into the head, thereby moving rack 70 and turning gears 71, 73, and 77, and rod 76 to swing tongue 84 through the slotted ear 83, as described above. Any tendency of the stake to buckle under additional pressure is countered by the tongue in its engagement with the slot. Continued pressure application will drive the stake into the ground.

Hydraulic cylinder 66 is controlled through a valve 86 positioned adjacent the tractor operator's seat. The valve is manually actuated to withdraw cylinder rod 66b, lowering the head 64, and is automatically moved to reverse rod travel after the head has moved a predetermined distance dependent upon the desired depth the stakes are to be driven, and to automatically stop head movement when it has again moved to its upper position.

Adjustment of the depth the stakes are driven is readily made by pivoting lower handle 90 about its pivot pin 91 against the biasing force of spring 92, withdrawing pin 93 from vertical post 94, sliding the handle and its support bracket 95 vertically along post 94 until a desired setting is obtained and then releasing handle 90 to allow pin 93 to extend into one of the spaced holes 96 in post 94. Similarly, the height to which the head 64 will be raised can be set as desired, merely by pivoting upper handle 97 about its pivot pin 98 against the biasing effect of spring 99 to withdraw pin 100 from vertical post 94, and then sliding the handle, together with its support bracket 101, to the desired position, before inserting pin 100 into the nearest spaced hole 96.

A collar 102 surrounds vertical post 94 and is freely slidable thereon. A pair of lugs 103, only one of which is shown in FIG. 1, extend laterally at opposite sides of collar 102 and are engaged by a slotted clevis 104, with one lug positioned in each slot 105. Clevis 104 is pivotally mounted on bracket 106 fixed to brace 79 and moves vertically with the brace during press operations. A detent arm 107 is pivotally mounted on another brace 108 fixed to brace 79 and a spring 109 connected between brace 79 and detent arm 107 biases it counter clockwise around its pivot mounting and into engagement with a V-slot 108 formed in clevis 104.

In operation, movement of the press is transmitted through clevis 104 and lugs 103 to collar 102 and when collar 102 contacts brackets 95 or 101 vertical post 94 will be moved. This movement is transmitted through a linkage consisting of members 110, 111, 112, inner pivot member 113 journalled on shaft 114, outer pivot member 115 fixed to shft 114, arm 116 fixed to shaft 114 and the valve actuator rod 117 pivotally connected to arm 116. When bracket 95 is contacted, to lower post 94, linkage rod 110 is pivoted down and its crank arm 111 is raised. This causes member 113 to pivot around shaft 114, against the biasing influence of a spring coiled about shaft 114 and having one end positioned on member 113 and the other end firmly anchored to outer member 115 at 118. Member 113 continues to move up, contacts adjustable stop 119 on outer member 115, and pivots member 115 until the weight of the opposite end of member 115 and the bias of the spring 120 fixed to that end is sufficient to snap member 115 counter-clockwise, thereby snapping the control valve to its other extreme position. When collar 102 contacts upper stop 101, post 94 is raised and linkage arm 112 is lowered, thereby lowering inner member 113. As the coil spring 120 is unwound its biasing force decreases until the weight of the end of member 114 adjacent arm 112 drops to its balanced position. This moves the control valve 86 back to its neutral position, and since inner member 113 does not pull outer member 115 all of the way down the valve is not moved to its extreme position. Should movement of rod 94 be prevented for any reason, continued movement of head 64 will cause clevis 104 to break away from lugs 103. The cylinder rod then continues its travel until its extreme position is reached, at which time pressure fluid is by-passed through a pressure relief valve—back to the hydraulic reservoir. During normal trellising operations two rows of trellises will be simultaneously constructed and both presses will be simultaneously actuated.

In order for the vehicle operator to know when he should stop the tractor and actuate the stake presses, I provide an indicator bell driven off the rear axle. A sprocket 122 (FIGS. 1 and 9) is fixed to the axle and a chain 123 drivingly interconnects sprocket 122 with one of the timer sprockets 123, 124, or 125 to drive shaft 126 fixed to each of the three timer sprockets. The diameter of the timer sprockets is selected such that they will revolve completely when a predetermined distance has been travelled by the rear tractor wheels. For pole bean trellising it has been found desirable to employ sprockets that will revolve once each time the tractor has travelled sixteen, eighteen, or twenty feet. The sprocket actually used will be dependent upon the desired spacing of stakes, as determined by soil conditions, etc. As illustrated chain 123 interconnects sprocket 122 and the larger of the three timer sprockets 125, thereby warning the operator that he should stop every twenty feet of travel and actuate the stake presses.

The distance warning device includes circumferentially perforated plate 127 fixed to the shaft 126 rotatable with the timer sprockets, a ring 128 carrying tooth 129, a spring 130 biasing tooth 129 into engagement with the perforations in plate 127, a sleeve 131 carrying ring 128 and freely rotatable and slidable on shaft 126 and a pivot pin 132 carried by sleeve 131 and on which the ring 128 is rotatably mounted.

After the first two vertical stakes in each row of trellises have been set, the operator positions tooth 129 in the hole in plate 127 that holds a cam portion 133 of sleeve 131 adjacent the back side of the free end of a pivotally mounted cantilever arm 134. As timer sprocket 125 revolves, it turns plate 127, ring 128 which has tooth 125 in engagement with the plate, and sleeve 131 to move cam portion 133 into engagement with the front side of cantilever arm 134. Continued rotation of sprocket 121 will pivot the cantilever arm, sleeve 135 to which it is connected and a depending clapper 136 fixed to the sleeve such that the clapper contacts freely suspended steel ring 137 to give a warning ring. Cam portion 133 will then continue past cantilever arm 134 and the weight of the clapper 136 will return sleeve 135 and the cantilever arm back to their starting position where the arm can once again be contacted by cam portion 128 after it has completed a full revolution.

*The wire-feed system*

The wire conventionally used in constructing trellises for pole beans is simply freely coiled, with the wire itself forming the loop. As a result, it does not always unwind evenly, and in the past it has frequently happened that the wire would break. In order to prevent this occurring, I provide a pair of special wire reels shown generally at 25 and 26, and carried by shafts 140 fixed to and extending sideways from the front of the tractor frame. Each reel includes a backing member 141 having a central opening 142 adapted to slide onto shaft 140 and a plurality of slideways 143 radiating outwardly from opening 142. An expansion unit, consisting of a central hub 144 adapted to slide on to shaft 140 and a plurality of arms 145 radiating outwardly from and pivotally connected to hub 144, carries wire engagement members 146. The wire engagement members have parallel sides 147 and 148 and sides 147 are adapted to slide in slideways 143. Sides 148 are similarly adapted to slide in corresponding slideways 149 on retainer cover 150. The outer edge 151 of each wire engagement member 146 is curved to match the shape of the inside of the coil of wire.

In use, the backing members 141 and expansion units are positioned on shafts 140 and the coil of wire is positioned to surround the wire engagement members. Springs 152 are positioned over shafts 140 and the retainer covers are placed on the shafts such that slideways 149 engage sides 148 of wire engagement members 146. As the retainer covers are pushed onto shafts 140, they force arms 145 out, thus forcing wire engagement members 146 into tight gripping engagement with the wire. Arms 145 consist of a pair of telescoping members 153 and 154, having stops 155 and 156 respectively thereon, and a spring 157 surrounding the telescoping members and positioned between the respective stops. Thus, as the wire is payed out and the inner and outer diameters of the coil change the wire engagement members 146 remain in constant engagement with it.

Backing plate 141 carries a brake drum 158 that is engaged by brake shoes 159 (FIGS. 1 and 2) pivotally connected to brackets 160 mounted on the tractor frame. Springs 161 bias the shoes into constant engagement with the drum and the tension on the wire can be regulated by setting nut 162 to change the brake tension.

Yokes 163 having handles 164 are pivotally connected to retainer covers 150 and co-operate with shoulders 165 formed on shafts 140 to hold the wire spools in position. Springs 166 may be provided to assist in biasing the yokes into engagement with shoulders 165 and to hold the yoke against shafts 140.

The wire comes off each reel and passes over a small guide pulley 170 adjacent a lower sliding member 171 of a slide assembly 172, around a large pulley 173 fixed at the opposite end of the slide assembly, back around a large guide pulley 174 at the end of an upper sliding member 175, over a tension pulley 176, around guide pulleys 177, 178 and 179 through hollow upper axle 180 of the trelliser and over a guide pulley 181 in use in constructing the trellis, or to gripping means 182.

Each of the guide and tension pulleys has a wire guard member 183 shaped to conform to the curvature of the pulley and to cover the circumference of the pulley around which the wire is passed. An extension 184 on the guard members (FIG. 13) extends into the pulley tracks such that there is just enough clearance for the wire to pass freely around the pulleys, but such that the wire cannot get out of the tracks.

The tension pulleys 176 are mounted at one end of arms 185, the other ends of which are pivotally connected to extensions of the wheel frames 32 at 186. Springs 187, anchored to brackets 188 fixed to frames 32 have their other ends fixed to extensions 189 of arms 185 and serve to bias the arms about their pivot connections 186 and toward the rear of the tractor. As the taut wire passes over the tension pulleys, the arms are pulled down. Should slack develop in the wires, it is immediately taken up by raising of the arms 185 under the biasing influence of springs 187.

The amount of tension on the wires is further regulated by adjustable brakes 190 on large pulley 174. The brakes consist of a plurality of fibre discs 191 slidably but non-rotatably mounted on shaft 192 rotatable with the large pulley 174 and spaced apart by plates 193 slidable on both shaft 192 and a parallel shaft 194 fixed to the wheel frame 32. A spring 195 positioned between the fibre discs and plates and a nut 196 threaded on the end of shaft 192 compresses the discs. The amount of compression is determinative of the braking force on the pulley and is regulated by the position of nut 196 on shaft 192. The amount of braking force applied to pulley 174 controls the tension on the wires.

Should the reels fail to feed wire they are each provided with a slide assembly 172 (FIG. 9) that will warn the operator and allow him to stop the tractor before the wires are broken or the previously placed trellis is pulled out. Thus, pulling on either wire, with the wire still on the reel being immobilized, will first lower arm 185 and then move lower sliding member 171 and upper sliding member 175 along their respective telescoped slide bars 200 and 201 toward the reel, carrying pulley 171 with them. This shortens the distance between the reel and pulley 173, between pulley 173 and large guide pulley 174, and between guide pulley 174 and tension pulley 176, and allows the wire to continue to be payed out. Constant tension is maintained on the wire during slide movement since sliding members 171 and 175 are interconnected by a brace 202 that is attached at one end of a cable 203. The other end of cable 203 is fixed to and extends around the periphery of a semi-wheel 204 rotatably mounted on frame 32 at the rear of the tractor. An eccentrically mounted semi-wheel 205 is fixed to and rotates with semi-wheel 204 and another cable 206 is fixed to the periphery of the eccentric at 207. The opposite end of cable 206 is fixed to an arm 208 pivotally mounted on frame 32 at 209 and the arm is biased by spring 210 anchored by bolt 211 to the member 33 to hold the cables, eccentric semi-wheel 205, semi-wheel 204 and sliding members in the position shown in FIG. 9.

As the slide moves forward in response to failure of the wire reel to feed properly the semi-wheels are rotated about their axis 212. As spring 210 stretches and the tension in the spring increases the rate of stretch is decreased because of the constantly decreasing distance between axis 212 and the tangential contact of cable 206 with the eccentric semi-wheel.

The tension in spring 210 can be set as desired merely by adjusting nut 212 along bolt 211 connected to the spring.

As the slide assembly moves toward the reel pin 213 contacts ear 214 (FIGS. 14 and 15) to sound an alarm that will cause the operator to immediately stop the tractor. Ear 214 is fixed to a sleeve 215 which is journaled about shaft 216 and shaft 216 is held in position by brackets 217 and 218 fixed to the wheel frame 32. Counterweight 219 is also fixed to sleeve 215 and normally biases another ear 220 into engagement with a clapper 221 extending downwardly from a similar sleeve 222 journaled on shaft 216 in side by side relationship with sleeve 215. Thus, when the slide assembly moves toward the wire reel, pin 213 contacts ear 214 and rotates sleeve 215 about shaft 216. Ear 220 contacts clapper 221 and pivots it into engagement with suspended pipe 223 to give a loud ringing sound. As the slide assembly moves on past ear 214, sleeve 215 is rotated back to its normal position under the influence of counterweight 219. When the slide assembly is moved back to its operating position pin 213 will contact the reverse side of ear 214 to again pivot sleeve 215. However, since the other ear 220 does not contact clapper 221 during this rotation of sleeve 215, the bell does not ring. As soon as the pin has passed over ear 214, counterweight 219 again biases sleeve 215 back to its normal position.

*The cord feed systems*

The lower cords for the trellises are supplied from a pair of cord spools 27 and 28, positioned at opposite sides of the tractor, through identical feed systems.

Each spool is mounted on a threaded and journaled shaft 240 (FIG. 2) extending forwardly from the wheel frames 32, and is held tightly on the shaft between a backing plate 241 and a retainer plate 242, formed integral with a threaded sleeve 243. A handle 244 is provided to allow the sleeve to be easily rotated on and off the correspondingly threaded shaft.

An arm 245 carrying a freely rotatable wheel 246 at its free end is pivotally mounted on frame 32 such that the wheel can rest against and roll on the cord wound around the spool. A spring 247 (FIG. 1) connected between arm 245 and the frame 32 normally holds the wheel against the cord to prevent the cord being pulled from the spool so rapidly that it becomes slack, and to maintain constant tension, regardless of the outer diameter of the spool.

The cords are normally fed from the spools around fixed guide pulleys 248 and movable pulleys 249 on the ends of pivot arms 250 connected to the tractor frame. A spring 251 biases the pulleys toward the front of the tractor to act as tighteners for the cords as they are distributed. The cords then extend rearwardly along the tactor frame and through hollow lower axles 252 (FIG. 4) of the trelliser for use in constructing the trellis, or to gripping means 253.

A brake assembly consisting of a brake drum 254 fixed to each shaft 240 and a pair of brake shoes 255 pivotally connected to frame 32 and biased by springs 256 into engagement with drum 254 determines the tension on the cords. The degree of tension can be varied as desired by merely adjusting the position of nuts 257 to change the tension on springs 256.

*The trellisers*

Each of the trellisers 29 and 30 consists of an interconnected pair of spaced front and rear upper sprockets 265 and 266 (FIG. 3) journaled about hollow upper axle 180, and a pair of rigidly interconnected spaced front and rear lower sprockets 267 and 268 journaled about the hollow lower axle 252. Front and rear vertical posts 269 and 270 (FIGS. 2 and 3), respectively interconnect axles 180 and 252 and upper and lower braces 271 extending between the vertical posts provide necessary reinforcement.

The trellisers 29 and 30 are interconnected by cross beams 272 and 273 (FIG. 4) and both trellisers are then supported on a lift arm 274 pivotally connected to lower cross-beam 272 and connected by linkage arms 275 and 276 (FIG. 16) to the square shaft 277 of the usual tractor lift. Thus, operation of the tractor lift to rotate square shaft 277 will rotate arm 276, raise arm 275 pivotally connected thereto, and pivot arm 274 about its fixed pivot rod 278 to simultaneously raise or lower both trellisers. Rods 279 fixed to the rear vertical posts 269 slide in sleeves 281 fixed to platforms 36 to guide the trellisers in their vertical movement.

A chain 282 passes around the front upper sprocket 265 and front lower sprocket 267 of each trelliser and carries eight equally spaced, conically shaped, twine holders 283. A similar chain 284 passes around the rear upper sprocket 266 and rear lower sprocket 268 of each trelliser and carries eight twine guides 284a corresponding to the eight twine holders.

The twine holders each include a hollow conically shaped member 285 (FIGS. 17 and 18) having a base flange 286. Member 285 is fixed by bolts 287 extending through flange 286 to a base plate 288, rigidly attached to chains 282, and a pivot rod 289 journaled in base plate 288 carries a pair of teeth 290 that are biased by spring 291 into protrusion through slot 292 in the wall of member 285. Pivoting of handle 293, fixed to rod 289 pivots teeth 290 into member 285 and allows a conical spool of twine to be slipped on the conical member. When handle 293 is released, the teeth are biased into gripping engagement with the fibre interior of the conical spool to keep it from being pulled off member 285. By forcefully rotating handle 293 the teeth can be more tightly engaged with the spool.

Both the upper and lower front and rear sprockets 265 and 266, and 267 and 268 are interconnected by rigid braces 295. In addition, the lower front sprockets 267 are rigidly connected by sleeves 296 surrounding hollow axle 252 to a drive sprocket 297. Thus, rotation of the drive sprockets 297 will drive lower front sprockets 267, which drive chains 282, and through braces 295 and the rear sprockets, chains 284.

Twine guides 284a (FIG. 2) each consist of a rigid tube 298 fixed to the periphery of chains 284 at a point opposite the twine holders and a flexible tube 299 carried by the rigid tube 298. The twine is pulled off the conical spools positioned on the twine holders and is passed through the rigid and flexible tubes of guides 284a, for use in constructing the trellises. The flexible tube 299 is sufficiently long to prevent the twine becoming entangled in the chains and sprockets.

Drive sprockets 297, and therefore the trellisers, are driven in accordance with the speed of the tractor from a large sprocket 300 on the rear axle of the tractor. Sprocket 300 (FIGS. 1 and 19) is positioned above and drives a chain 301 extending around rear pulleys 302 and 303 at the rear of one side of the tractor and a front sprocket 304 fixed to a sleeve 305 journalled on a jack shaft 306 (FIGS. 19 and 20) toward the front of the vehicle. An idler sprocket 307 holds chain 301 in engagement with gear 300 and a rotatably mounted pulley 308 carried by arm 309 pivotally mounted to the tractor frame at 310 and biased by spring 311 into engagement with the chain serves as a chain tightener and prevents the chain being carried up and around the sprocket when the tractor is backed.

Rear pulleys 302 and 303 are rotatably mounted on respective arms 312 and 313 of bracket 314. Bracket 314 is journaled on shaft 315 fixed to the tractor frame and another arm 316 is connected through linkage arm 317 to pivot arm 274 such that pivoting of arm 274 to raise the trellisers will raise arm 217 and lower rear pulleys 302 and 303, thereby moving chain 301 out of mesh with gear 300. It can be seen, therefore, that when the trellisers are raised to a travel position they cannot be driven.

Rotation of front sprocket 304 when the vehicle is driven and chain 301 is positioned to be in mesh with sprocket 300 is transmitted to gear 318 (FIG. 20) also fixed to sleeve 305. A cam wheel 319 (FIGS. 20 and 21) is journalled about sleeve 305 and carries four equally spaced dog members 320 (only two of which are illustrated), pivotally mounted, and biased by springs 321 into engagement with gear 318 such that the dogs will allow rotation of gear 318 separately from cam wheel 319 in one direction, that such that in the other direction of drive of the gear cam wheel 319 is rotated in the same direction.

A member 322, fixed to jack shaft 306 carries the cam follower wheel 323. Whenever cam wheel 319 is rotated in conjunction with gear 318, stops 324 on the cam wheel engage member 322 to rotate it and the jack shaft, thereby driving the trellisers. At the same time the cam wheel is moved to position the follower on a high part and brake shoes 325 and 326 are released from brake drum 327 fixed to the tractor frame and through which jack shaft 306 is journalled. As the cam follower is raised, arm 328 carrying brake shoe 325 is moved away from the brake drum, against which it is normally biased by spring 329 interconnecting arm 328 and member 322. Movement of arm 328 is transmitted through rod 330 and pivot arm 331 to also move arm 332 connected to brake shoe 326 against the bias of spring 333 away from the brake drum. Should the vehicle roll back slightly, for example when it is stopped to place a stake, the cam wheel 319 is moved to position cam follower wheel 323 on a low part of the cam, and the brakes are automatically applied by the biasing springs. This immobilizes jack shaft 306 and prevents any reversal of the drive of the trellisers. When the vehicle is again moved forward, the same amount of travel is required to position the cam follower wheel on the high portion of the cam and the brakes are released and the trelliser can again begin operation at the same point where forward travel had previously ceased.

Should the operator forget to raise the trelliser and disconnect it from its drive before backing the tractor, the trelliser will still not operate in reverse since dog members 320 will allow front sprocket 304, sleeve 305, and gear 318 to freely rotate, while the jack shaft and hence the trellisers are immobilized. If desired another stop can be fixed to the cam wheel to insure that frictional interengagement of gear 318 and the cam wheel does not move the cam wheel sufficiently to place the high portion of the cam beneath the cam follower wheel during backing of the tractor.

Jack shaft 306 is formed in two sections 306a and 306b interconnected by a buffer spring assembly that prevents damage to the trelliser drive as a result of the frequent starting and stopping encountered during trellising operations. The buffer spring assembly consists of a flange 330a on each segment of the jack shaft, bolts 331a loosely interconnecting matching ears 332a on the flanges and coil springs 333a surrounding the bolts 331a between the matching ears. These springs serve to absorb much of the initial shock encountered by starting and stopping jack shaft segment 306a.

The other end of jack shaft segment 306b is connected to a conventional around the corner gear box 334, FIGS. 20 and 22 positioned at the opposite side of the tractor. The output shaft 335 from the gear box is connected by a universal coupling 336 to a drive shaft 337 which in turn is connected through another universal coupling 338 and a slip clutch unit 339 to the main drive sprocket 340 for the trellisers. A chain 341 extends around one side of main drive sprocket 340 and around drive sprockets 297. A guide pulley 342 guides the chain for meshing engagement with main drive sprocket 340 and a rotatable mounted pulley 343 carried by a pivot arm 344 on one of the front vertical posts 269 is biased by spring 345 into engagement with the chain and acts as a tightener to maintain chain tension.

Slip clutch unit 339 prevents damage to the drive assembly should something catch in the trellisers and prevent their rotation. Clutch plate 346 is fixed to shaft 347, about which sprocket 340 is journalled. The other clutch plate 348 slides on shaft 347 and pins 349 fixed to sprocket 340 and is biased into driving engagement with clutch plate 346 by springs 350 surrounding pins 349 and positioned between plate 348 and a backing member 351 fixed on the ends of pins 349. Should the trelliser become immobilized the shaft 347 and clutch plate 346 would continue to rotate since the springs would allow clutch plate 348 to yield.

The hydraulic control system for the stake carrier and stake press at one side of the tractor is shown schematically in FIG. 24; and the system for the other side is identical.

In constructing the trellises, stakes are placed in the presses and the press control valve is actuated to move the valve spool 352 of valve 86 (FIG. 24) to the right. Pressure is then supplied through pump 57 and conduit 353 from the reservoir 56 to the upper end of cylinder 66 to force piston 354 therein down. At the same time pressure in the other end of the cylinder is exhausted through conduit 355. As has been explained, this forces the stake press down, driving the stake into the ground. When the stake has been driven the predetermined depth, the valve spool is automatically moved to its extreme left position to reverse the supply to, and exhaust from, the cylinder, thereby moving the piston up. When the press reaches its upper stop, the valve spool is moved back to illustrated neutral position, all as has been previously described.

As is seen in FIG. 25, upper wire and lower cord are anchored to the first stake 360 in each row of stakes and strings from four adjacent spools are tied at the bottom of the stake while string from the other four are tied at the top.

Another stake 361 is similarly placed a short distance from the first stake and a cross brace 362 is manually placed across the two stakes to provide the necessary row end reinforcement. After the second stake has been placed, ring 123 of the distance warning device is set to indicate to the operator when he should stop and drive additional stakes. As the vehicle travels, the wire and cord are payed out under constant tension, as has been described, and the trellisers operate to revolve the string around the wire and cord, thus giving a close crisscross formation. Since the trellisers operate slower than the trellisers of the usual four-spool machines no more string is required than has heretofore been used. At the ends of each row close end stakes are driven and a cross brace is manually placed between them. The wire, cord, and strings are then tied off at the last stake and a new row is begun. Gripping means 182 and 253 on each trelliser consist of eccentrically mounted circular members 370 that can be rotated together to grip the wire and cord, and these are desirably positioned on rear vertical posts 270 where they can be used each time the wire and cord are cut. Additionally, a wire cutter can be mounted on rear post 270 for use in cutting the wire at the end of each row, if desired.

Outside the rear wheels of the tractor and forming an integral part of wheel frame 32 is a rack 370, consisting of upright members 371 that will support extra string spools, wire and cord spools as required.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed herebelow.

I claim:
1. A pole bean staking and trellising machine comprising a tractor; at least one stake rack carried by said tractor; means for moving said rack between a lowered position adjacent the ground and a raised position over a rear wheel of the tractor; at least one stake press carried by said tractor; means to actuate said press to force stakes placed therein into the ground; at least one trelliser carried by said tractor; means interconnecting said trelliser and the rear axle of said tractor whereby the trelliser is driven at a speed dependent upon the speed of rotation of said axle; at least one wire reel carried by said tractor means for guiding wire from said reel to an outlet at the rear of the tractor; at least one cord spool carried by said tractor; means for guiding cord from said spool to an outlet at the rear of the tractor at a point below the wire outlet, said wire and cord outlets being positioned such that string carried by said trelliser is wrapped around wire and cord distributed through the outlets.

2. The machine of claim 1, further including alarm means actuated upon a predetermined forward travel of the tractor.

3. The machine of claim 2, further including means to maintain a uniform predetermined tension on the wire.

4. The machine of claim 3, further including means to maintain uniform predetermined tension on the cord as the outer diameter of the cord spool changes.

5. The machine of claim 4, further including alarm means to warn the operator should the wire reel become immobilized and to continue wire distribution under the uniform tension until the operator has time to stop the tractor.

6. The machine of claim 1, further including means to automatically disconnect the trelliser from the rear axle of the tractor when said tractor is backed.

7. The machine of claim 1, further including slip-clutch means whereby the means interconnecting the trelliser and the rear axle of the tractor is not damaged should said trelliser be immobilized.

8. The machine of claim 1, wherein the stake press includes a vertically reciprocable head; the means to actuate said press includes a reservoir, a pump, a hydraulic cylinder interconnecting the press head and the tractor, and a control valve positioned to control supply of pressure fluid to and exhaust from the cylinder such that said head is driven down; and means responsive to movement of the head to a predetermined low position to automatically actuate said valve to supply pressure fluid to and exhaust fluid from the cylinder to reverse the direction of travel of the head, and to stop flow through the valve, thereby immobilizing the head when it has reached a predetermined high position.

9. The machine of claim 8, wherein means are provided to surround a portion of a stake in the press during downward movement of the head, to thereby prevent buckling of the stake.

10. A pole bean staking and trellising machine comprising a tractor; a pair of stake presses carried by said tractor, each of said stake presses including a fixed sleeve and a reciprocating member having a head thereon, said reciprocating member being guided in said fixed sleeve; means for driving said reciprocating member from a raised rest position to a low reversing position and back to the raised rest position; a pair of trellisers carried by said tractor, each of said trellisers including upper and lower front sprockets, a trelliser chain interconnecting said upper and lower front sprockets, another trelliser chain interconnecting said upper and lower rear sprockets, a first hollow axle journalled through said upper sprockets, a second hollow axle journalled through said lower sprockets, support means for said first and second hollow axles, means rigidly interconnecting said upper sprockets, means rigidly interconnecting said lower sprockets, a plurality of means for holding spools of string on the chain interconnecting the front sprockets, string guide means fixed to and carried by the chain interconnecting the rear sprockets, and a drive sprocket fixed to the lower sprocket and rotatable therewith; drive means for said drive sprocket, said drive means including a sprocket fixed to the rear axle of the tractor and means interconnecting the sprocket fixed to the rear axle and the drive sprocket whereby said trelliser chains are driven at a speed dependent upon the speed of the tractor; means for supplying wire under constant tension through said first hollow axles; and means for supplying cord under constant tension through said second hollow axles.

11. The machine of claim 10, further including a collar fixed to and movable with each of said reciprocating members, said collars extending around said fixed sleeves and including a slotted ear extending outwardly therefrom; a stake engagement member reciprocably mounted in said head; a rack carried by said stake engagement member and reciprocable therewith; a shaft journaled through said head; a pinion gear on the end of the shaft in said head, said pinion gear being engaged by said rack to rotate said shaft; a first bevel gear fixed to the other end of said shaft; a second beveled gear; means holding said second beveled gear in meshing engagement with said first bevel gear; a rod fixed at one of its ends to the second beveled gear and rotatable therewith; a box fixed to the other end of the rod; and a tongue carried by said box, whereby rotation of said second bevel gear and said rod rotates said box to extend said tongue into the slotted ear.

12. The machine of claim 11, further including means to simultaneously raise said trellisers from a lowered working position to a raised carrying position; and means to disengage the drive sprocket from the sprocket on the tractor rear axle upon raising of the trellisers.

13. The machine of claim 10, wherein said means interconnecting the drive sprocket and the sprocket fixed to the rear axle of the tractor includes means to disengage the sprockets when said tractor is backed.

14. The machine of claim 13, wherein said means interconnecting the drive sprocket and the sprocket fixed to the rear axle of the tractor further includes a slip clutch for allowing the sprocket on the axle to rotate when the trellisers are held rigid.

15. The machine of claim 10, wherein each means for supplying wire under constant tension through said first hollow axle includes a shaft fixed to the tractor frame; a wire reel, said reel including a backing plate centrally bored to slide on the shaft and having a brake drum on one side thereof and radial guideways on the other side, a central hub slidable on said shaft, a plurality of wire engagement members extending slidably outwardly from the hub in the guideways, means yieldably biasing said wire engagement members outwardly from the hub; a retainer plate having a central bore for sliding on the shaft, and guideways corresponding with the guideways on the backing plate for engaging the wire engagement members; and lock means to hold said backing plate, central hub, and retainer plate on the shaft; brake shoes engageable with the brake drum on the backing plate; and means for adjusting the pressure applied through said brake shoes to the brake drum.

16. The machine of claim 15, wherein the means for supplying wire under constant tension further includes a sliding pulley about which wire from said reel is passed; a fixed pulley at the end of the slide for said sliding pulley nearest the reel; adjustable brake means for said fixed pulley; a movable pulley; an arm pivotally connected at one end to the tractor and carrying the movable pulley at the other end; a spring biasing said arm carrying the movable pulley upwardly; a first wheel having a central axle journalled in a frame fixed to the tractor; a cable fixed at one end to the sliding pulley, passing partially around the periphery of the wheel and connected at its other end to the wheel; a second wheel eccentrically mounted on the axle of the first axle and rotatable with the first wheel; a second cable fixed to the periphery of the eccentrically mounted wheel at the point most remote from the axle, and spring means connected between the free end of said second cable and a member rigidly connected to the tractor, whereby wire is passed from the reel, around the sliding pulley and the fixed pulley, and over the movable pulley before passing through the first hollow axle such that upon failure of the wire to feed from the reel the pivoted arm is pulled down against the bias of the spring connected thereto and the sliding pulley is moved along its slide, pulling on the first cable to unwind it from the wheel and winding the second cable around the eccentrically mounted wheel as the spring attached to the cable is stretched.

17. The machine of claim 16, further including alarm means actuated by movement of said sliding pulley.

18. The machine of claim 17 wherein the means for supplying cord under constant tension includes adjustable brake means on the cord spool.

19. The machine of claim 18, wherein the means for supplying cord under constant tension further includes a roller; an arm pivotally fixed to and supporting said roller; and means biasing said roller into engagement with the cord on its spool such that the biasing force is decreased as the cord is payed out and the size of the spool decreases.

References Cited by the Examiner
UNITED STATES PATENTS

| | | | |
|---|---|---|---|
| 2,541,302 | 2/1951 | Slangal | 47—1 |
| 2,547,352 | 4/1951 | Wiemers | 47—1 |
| 2,641,084 | 6/1953 | Estes | 47—1 |
| 2,753,661 | 7/1956 | Wiemers | 47—1 |

ANTONIO F. GUIDA, *Acting Primary Examiner.*

R. E. BAGWILL, *Assistant Examiner.*